United States Patent [19]

Dressler et al.

[11] 4,369,824
[45] Jan. 25, 1983

[54] CUTTING TOOL FOR TREE DELIMBING DEVICE

[75] Inventors: Mirko Dressler, Krtiny; Vojtech Formanek, Jedovnice; Václav Michl, Krtiny; Miroslav Stejskal, Adamov-Josefov, all of Czechoslovakia

[73] Assignee: Vyzkumny ustav lesniho hospodarstvi a myslivosti, Jiloviste-Strnady, Czechoslovakia

[21] Appl. No.: 189,342

[22] Filed: Sep. 22, 1980

[30] Foreign Application Priority Data

Sep. 24, 1979 [CS] Czechoslovakia .................... 6430-79

[51] Int. Cl.³ .............................................. B27L 1/00
[52] U.S. Cl. ................................... 144/343; 144/2 Z
[58] Field of Search ............... 144/2 Z, 3 D, 309 AC, 144/343

[56] References Cited

U.S. PATENT DOCUMENTS

| | | | |
|---|---|---|---|
| 3,252,487 | 5/1966 | Larson et al. | 144/2 Z |
| 3,572,410 | 3/1971 | McElderry | 144/2 Z |
| 3,672,413 | 6/1972 | Jouppi | 144/2 Z |
| 3,713,467 | 1/1973 | Pierrot | 144/2 Z |
| 3,809,134 | 5/1974 | McCabe | 144/3 D |
| 3,941,174 | 3/1976 | Oldenburg | 144/2 Z |
| 4,050,486 | 9/1977 | Whitcomb | 144/2 Z |
| 4,167,960 | 9/1979 | Wildey | 144/2 Z |

FOREIGN PATENT DOCUMENTS 653107 3/1979 U.S.S.R. .............................. 144/2 Z

*Primary Examiner*—W. D. Bray

[57] ABSTRACT

The invention relates to timber processing machinery, and particularly to a cutting tool for tree delimbing devices used in timber harvesting.

The cutting tool, according to the invention, comprises knives which are secured in a holder fixedly or movably attached to the frame of the delimbing device. The knife bed has a front surface and a back surface which form an angle therebetween. The knife itself has a back surface and a cutting edge surface which form a negative angle and which are supported in a shoulder at the knife bed. The back surface of the knife is disposed above the back surface of the knife bed in which said knife is mounted.

To increase the cutting effect of the delimbing device, the knife, the cutting edge thereof, the bed for the knife and bed shoulder can have a sagittate shape, or the cutting edge can be provided with sagittate teeth.

The cutting tool is designed especially for devices to be employed for delimbing trees of coniferous wood species. A cutting tool for tree delimbing containing knives that are mounted in a knife bed which is provided with a shoulder in such a manner that the surface of the knife back portion is disposed above the back portion of the knife base and the knife, its cutting edge, the knife bed and the bed shoulder have sagittate-shaped teeth.

5 Claims, 6 Drawing Figures

CUTTING TOOL FOR TREE DELIMBING DEVICE

BACKGROUND OF THE INVENTION

The invention relates to harvesting timber, and more particularly to a cutting tool to be used in devices for delimbing trees of various, preferably coniferous wood species.

Hitherto various tree delimbing processes have been applied. One of the most widely used processes consist in trimming and delimbing the treetrunk, as it advances, by means of a system of stationary and movable knives which are forced thereonto by any mechanical means such as, for instance, leverage systems, or by means of link chains provided with knives. The cross-section of such knives is very simple; the knife bodies have only a plain wedge angle and are supported directly in holders, or fixed to one another by joint pins.

In operation, most of such knives exhibit relatively high resistances both cutting and frictional. A tree delimbing process of the afore-described type is, for example, described in the August 1980 issue of the WORLD WOOD journal.

SUMMARY OF THE INVENTION

It is an object of the present invention to eliminate the above-mentioned disadvantage and to provide an improved cutting tool for timber harvesting, and particularly tree delimbing devices.

In accordance with one feature of this invention, the cutting tool comprises knives having a front portion, a back portion and a negative angle at the back portion. The knives are mounted in a knife bed which is provided with a shoulder in such a manner that the surface of the knife back portion is disposed above the back portion of the knife base.

To make the tree delimbing process more effective, the knife, its cutting edge, the knife bed and the bed shoulder preferably have sagittate-shaped teeth.

The improved effectiveness of the invention over the prior art consists in that a negative angle of the back portion prevents the knives from cutting into the tree trunk body proper. Further, by positioning the surface of the knife back portion above the back portion of the base, a reduction of friction surfaces is achieved sufficient to lower the demand of tractive forces necessary for drawing the tree limb through the knife head by about 20 to 30% in comparison to a conventional delimbing process. An even higher effect can be obtained by providing the base with a more acute angle than that of the cutting edge, and by providing a sagittate-shaped cutting edge which can be alternatively provided with sagittate-shaped teeth. Apart from this, the cutting tool of the invention makes possible an economy in high-grade steel alloys to be attained since it is only necessary that the knife is made from such a material while the base can be made from other less expensive materials.

BRIEF DESCRIPTION OF THE DRAWING

In order that the invention be better understood and carried into practice, some preferred embodiments thereof will be hereinafter described with reference to the accompanying schematic drawings in which.

DETAILED DESCRIPTION

Figure 1:
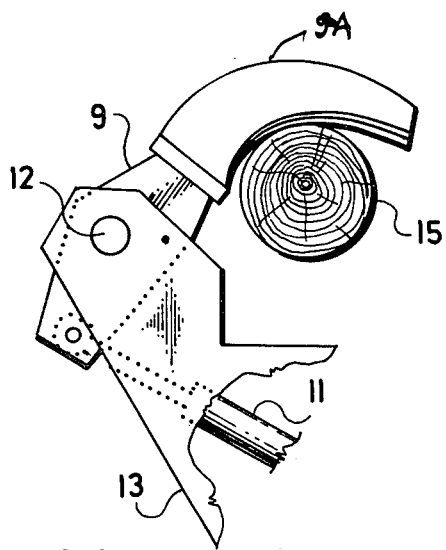
FIG. 1 is a side-elevational view of the arrangement of the invention.
Figure 2:
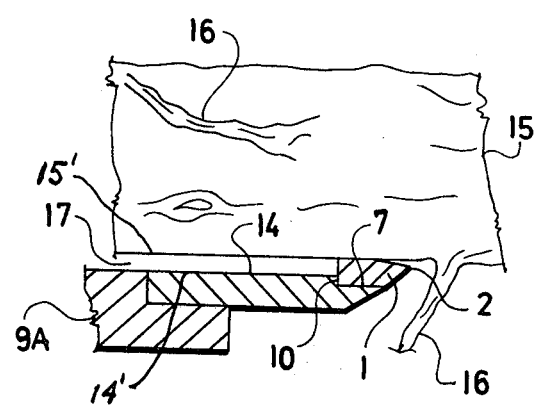
FIG. 2 is a sectional view of the knife.
Figure 6:
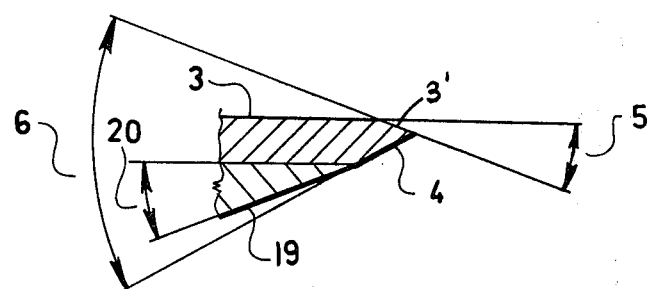
FIG. 6 is an enlarged cross-sectional view of the cutting edge of the knife.
Figure 3:
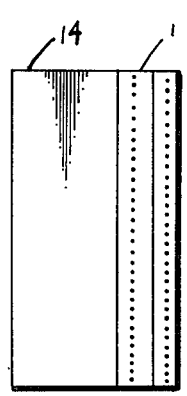
FIG. 3 is a top view of a first embodiment of the knife with a linear cutting edge.

As can be seen in the drawings, and particularly FIG. 1 thereof, knives 1 of the cutting tool 9A are accommodated in a knife holder 9 which is either fixedly or movably mounted in a frame portion 13 of the delimbing device. When the knives are movably mounted, the knife holders 9 are mounted so as to swing about a pivot 12 and are actuated in a manner not illustrated in detail as, for example, by means of a hydraulic cylinder and piston arrangement 11. The knife 1 is secured by any means in a bed 7 in such a way that its back surface 3 is situated above the back surface of a base 14 in which the bed 7 for the knife 1 is disposed, whereby a clearance 17 is provided between a tree trunk 15 and the back surface 14' of said base 14. (FIG. 2). The bed 7 is defined by a shoulder 10. The back surface 3 of the knife 1 includes a cutting edge surface 3' which makes a negative angle 5 with the back surface 3. The knife has a pointed edge 2 formed by the intersection of the edge surfaces 3' and 4. The edge surfaces 3' and 4 form a wedge angle 6 therebetween.

Figure 4:
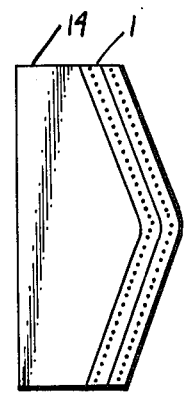
FIG. 4 is a top view of an alternate embodiment of the knife with a V-shaped cutting edge.
Figure 5:
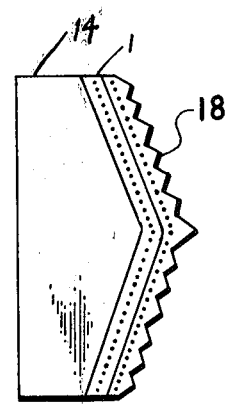
FIG. 5 is a top view of still another embodiment of the knife with a sagittate-shaped cutting edge.

Alternatively, the pointed cutting edge 2, the bed 7 and the shoulder 10 of the bed 7 can have a sagittate shape. According to a preferred embodiment, the cutting edge 2 can be provided with sagittate teeth 18. (FIG. 4). Also, the cutting edge 2 may be V-shaped. (FIG. 4). A higher effect can be obtained by providing the knife bed with a front surface 19 which forms an angle 20 with the knife bed back surface 7 which is more acute than the angle of the cutting edge 6.

In operation, the stationary and the movable knives 1, fixed in the holders 9, are swingable about the pivots 12 and are forced into the tree trunk by means of the hydraulic cylinder and piston arrangement 11. The tree trunk 15 is pulled by any suitable means, not described or illustrated in detail, through the delimbing device while its branches 16 are drawn against the knife cutting edge 2. The tree trunk 15 is dragged on the back surface 3 of the knife 1 so that it does not come into contact with the surface 14' of the back portion of the base 14; the clearance 17 between the treetrunk surface 15' and surface 14' of the base 14 provides for a substantial reduction of drag resistances since minor projections extending out of the tree trunk surface 15' remain intact and can pass over the surface 14' of the base 14. This has been experimentally proved.

The negative angle 5 of the knife back surface 3' prevents the cutting edge from cutting into the tree trunk 15 proper when encountering major trunk deformations. A still higher reduction of demand of drag forces can be obtained by the sagittate shape of the knife 1, its cutting edge 2, the bed 7 and the shoulder 10. The cutting effect can be even further enhanced by providing the cutting edge 2 with sagittate teeth 18.

The invention is designed for use in the forest industry, and particularly for devices for delimbing trees, preferably of coniferous wood species.

Although the invention is illustrated and described with reference to a plurality of embodiments thereof, it is to be expressly understood that it is in no way limited to the disclosure of such preferred embodiments, but is capable of numerous modifications within the scope of the appended claims.

What is claimed is:

1. A cutting tool for a tree delimbing device, having means for moving the treetrunk to be delimbed in a transport direction comprising in combination,
   a frame;
   a knife holder operatively mounted on said frame;
   a knife bed secured to said knife holder and having a back surface and a shoulder;
   a knife mounted in said shoulder of said knife bed and having a back surface, a back cutting edge surface, and a front cutting edge surface, said back and front cutting edge surfaces forming a cutting edge therebetween in said transport direction, said back surface of said knife forming a negative angle with the back cutting edge surface, the back surface of said knife being disposed above the back surface of said knife bed.

2. The cutting tool for a tree delimbing device as set forth in claim 1, wherein the knife, its cutting edge, the knife bed, and its shoulder have a sagittate shape.

3. The cutting tool for a tree delimbing device as set forth in claim 1, wherein said cutting edge has a plurality of sagittate teeth.

4. The cutting tool for a tree delimbing device as set forth in claim 1, wherein said knife bed has a front surface which forms an angle with the knife bed back surface which is more acute than the angle of the cutting edge.

5. A process for delimbing trees, including the steps of
   (a) placing a tree trunk on a supporting frame; having at least one knife holder mounted thereon in which a knife bed having a knife with a cutting edge is secured, the knife bed and knife having back surfaces confronting the tree trunk, the back surface of the knife bed being spaced from the tree trunk surface and the back surface of said knife being in contact with the tree trunk surface; and
   (b) pulling the tree trunk over the back surface of the knife thereby forcing the knife edge against any limbs extending from the tree trunk to thereby cut these limbs.

* * * * *